United States Patent [19]

Shiraishi et al.

[11] Patent Number: 5,748,355
[45] Date of Patent: May 5, 1998

[54] MULTI-BEAM LASER EXPOSURE UNIT HAVING ANAMORPHIC LENS COMPRISING THREE LENSES

[75] Inventors: Takashi Shiraishi, Sagamihara; Masao Yamaguchi, Kawaguchi, both of Japan

[73] Assignee: Kabushiki Kaisha Toshiba, Kawasaki, Japan

[21] Appl. No.: 527,781

[22] Filed: Sep. 13, 1995

[30] Foreign Application Priority Data

Nov. 9, 1994 [JP] Japan ................... 6-274949

[51] Int. Cl.$^6$ ........................... G02B 26/08
[52] U.S. Cl. ................. 359/206; 359/204; 359/207; 359/216; 359/217; 347/244
[58] Field of Search ................ 359/204, 205, 359/206, 207, 212, 216, 217, 218, 219; 347/241, 243, 244

[56] References Cited

U.S. PATENT DOCUMENTS

| | | | |
|---|---|---|---|
| 4,634,232 | 1/1987 | Tateoka | 359/204 |
| 5,086,350 | 2/1992 | Nishihata | 359/205 |

FOREIGN PATENT DOCUMENTS

| | | |
|---|---|---|
| 63-9361 | 1/1988 | Japan . |
| 64-75239 | 3/1989 | Japan . |
| 5-34612 | 2/1993 | Japan . |
| 5-83485 | 4/1993 | Japan . |

*Primary Examiner*—Paul M. Dzierzynski
*Assistant Examiner*—Darren E. Schuberg
*Attorney, Agent, or Firm*—Foley & Lardner

[57] ABSTRACT

A multi-beam laser exposure unit includes a light beam deflector for deflecting light beam in a predetermined direction, a plurality of laser devices, a pre-deflection optical system, including a glass lens and a plastic lens, for converting a cross sectional shape of light beam emitted from the respective laser devices to a predetermined shape, and a post-deflection optical system, including three lenses for image-forming each light beam deflected by the deflector to be scanned on a predetermined image surface at a uniform speed. Power of three lenses of the post-deflection optical system is defined to be positive, negative, positive in order in a direction parallel to a rotational axis of each of reflective surfaces of the deflector from the side close to the deflector. Also, the power of three lenses of the post-deflection optical system is defined to be positive, negative, positive in order in a direction perpendicular to the rotational axis. Thereby, an effective deflection angle can be enlarged and a registration error can be reduced.

8 Claims, 8 Drawing Sheets

MULTI-BEAM LASER EXPOSURE UNIT HAVING ANAMORPHIC LENS COMPRISING THREE LENSES

BACKGROUND OF THE INVENTION

1. Field of the Invention

The present invention relates to a multi-beam exposer unit, which can be used in a color printer having a plurality of drums, a color copy machine having a plurality of drums, a high-speed laser printer or a digital copy machine, for scanning a plurality of beams.

2. Description of the Related Art

In an image forming unit such as a color printer having a plurality of drums or a color copy machine having a plurality of drums, there are used a plurality of image forming sections for forming an image in accordance with color components, which are color-separated, and a laser exposer unit for providing a plurality of image data, i.e., a plurality of laser beams including every color component. As a laser exposer unit, there are known one example in which a plurality of laser exposer units are arranged and another example in which a multi-beam laser exposer unit, which is structured to be able to provide a plurality of laser beams.

In Jpn. Pat. Appln. KOKAI Publication No. 5-83485, there is an example using N sets of a light source, a cylinder lens, and glass fθ lens groups, and N/2 of polygon mirrors wherein the number of beams is N. For example, in the case of four beams, four sets of the light source, the cylinder lens glass fθ lens group, and two polygon mirrors are used.

Moreover, for example, there is proposed an example of using a lens of a part of the fθ lens group in common. In other words, there is proposed a method in which two groups of fθ lens are set, all laser beams are passed through the fθ lens close to the polygon mirror, the number of fθ lenses far away from the polygon mirror is set to four, and each laser beam is individually passed through each lens.

Separately from the above examples, Jpn. Pat. Appln. KOKAI Publication No. 62-232344 discloses an example in which at least a part of a lens surface of the fθ lens is formed to have a toric surface to be used in common. Also, in Jpn. Pat. Appln. KOKAI Publication No. 62-232344, there is proposed that several fθ lenses are formed of plastic to improve degree of design freedom of each lens surface and an aberration characteristic at an image-forming position. Jpn. Pat. Appln. KOKAI Publication No. 62-232344 also discloses a method in which each lens is used in common and all laser beams are passed through each lens.

Jpn. Pat. Appln. KOKAI Publication No. 5-34612 discloses a method in which a plurality of half mirrors is used and the laser beams emitted from a plurality of light sources are made incident on one polygon mirror.

As compared with a case using a plurality of laser beam exposer units, the space which is occupied by the laser exposer unit, is reduced in the case using the multi-beam laser beam exposer unit seen in Jpn. Pat. Appln. KOKAI Publication No. 5-83485. However, from the viewpoint of the single laser exposer unit, the cost of parts and that of the assembly rise due to increase in the number of lenses or the number of mirrors. Moreover, the size and weight as a single unit are increased. Furthermore, it is known that curve of the main scanning line of the laser beam of each color component or deviation of the aberration characteristic on the image-forming surface such as a fθ characteristic becomes uneven due to deviation of the manufacture of the same fθ lenses, an error included in individual fθ lenses, or an error of the attachment. There is also proposed a method in which a plurality of second fθ lenses are arranged to correspond to each laser beam. However, even in this method, due to deviation of the manufacture of the same second fθ lenses, an error included in individual second fθ lenses, or an error of the attachment, the same disadvantages seen in Jpn. Pat. Appln. KOKAI Publication No. 5-83485 are generated.

Moreover, in the case of Jpn. Pat. Appln. KOKAI Publication No. 62-232344, since only the toric surface whose shape is not optimized is provided, there is a problem in that curve of the main scanning line is generated in any of the plurality of laser beams. There is also proposed an example in which a part of the laser beam directing to a deflector is controlled to be directed to a direction of an optical axis. However, it is difficult to sufficiently compensate for the aberration characteristic in all image-forming areas. Moreover, a refractive index of the lens formed of plastic is relatively largely changed by the change of temperature. Due to this, field curvature, curve of the main scanning line, or the fθ characteristic are largely varied under environmental conditions over a wide range, particularly a state that the temperature condition is changed, there occurs a problem in which a field curvature, and a curve of the main scanning line, or the fθ characteristic are largely varied. Moreover, in the case of Jpn. Pat. Appln. KOKAI Publication No. 62-232344, conditions such as achromatism on the entire area of the sub-scanning direction, curvature, distortion of the image surface, and a lateral magnification are not satisfied. Due to this, the number of lenses is increased. Furthermore, since accuracy of housing must be extremely highly set in order to ensure parallelism of the main scanning line of each laser beam, the manufacturing cost rises.

In the case of Jpn. Pat. Appln. KOKAI Publication No. 5-34612, since the light density of the laser beam, which is passed through the large number of half mirrors, must be sufficiently ensured, it is needed that the size of the light source be enlarged. Due to this, an amount of heat sent from the light source is increased, and a mechanism for cooling is required.

Moreover, there is known that a direction of the curve of the main scanning line obtained by a curve of the fθ lens is reversely set by the number of mirrors (separation mirrors), which are provided between the post-deflection optical means and the image-formed position.

SUMMARY OF THE INVENTION

An object of the present invention is to provide a multi-beam laser exposer unit, which can be applied to the image forming unit for forming a color image in proper registration, with low cost.

Another object of the present invention is to provide a multi-beam laser exposer unit which does not need complicated adjustment.

Moreover, another object of the present invention is to provide a multi-beam exposer unit, which is not subjected to influence of deviation between the beams, that is, an error included in individual fθ lenses.

According to a first aspect of the present invention, there is provided a multi-beam laser exposer unit, comprising: light beam sources for emitting light beam; deflecting means, having reflective surfaces formed to be rotatable around a rotatable axis, for deflecting light beam emitted from the light beam sources in a predetermined direction; pre-deflection optical means, provided between the deflecting means and each of the light beam sources, for converting the light beam from the light beam sources to a convergent light beam in a direction parallel to a rotational axis of each surface of the deflecting means, and to a convergent light beam or a parallel light beam in a direction perpendicular to the rotation axis of each surface of the deflecting means so as to be guided to the reflective surfaces of the deflecting means; and post-deflection optical means having three lenses, the lenses having positive, negative, and positive power, respectively, in the direction parallel to the rotational axis of each surface of the deflecting means, the lenses having positive, negative, and positive power, respectively, in the direction perpendicular to the rotational axis of each surface of the deflecting means, and each of the lenses having a function of image-forming each of the light beams deflected by the deflecting means to be scanned on a predetermined image surface at an uniform speed, and a function of correcting influence of variation of an inclination of the reflective surface on a position of the light beam on the image surface, being exerted onto each of the light beams, expressed as deviation of an angle formed between the reflective surface of the deflector and the rotational axis of the reflective surface.

According to a second aspect of the present invention, there is provided a multi-beam laser exposer unit comprising: light beam sources for emitting light beam; deflecting means, having rotational axis and reflective surfaces formed to be rotatable around the rotational axis, for deflecting light beam emitted from the light beam sources in a predetermined direction;

pre-deflection optical means, provided between the deflecting means and each of the light beam sources, for converting the light beam from the light beam sources to a convergent light beam in a direction parallel to the rotational axis of each surface of the deflecting means, and to a convergent light beam or a parallel light beam in a direction perpendicular to the rotational axis of each surface of the deflecting means; and post-deflection optical means having three lenses, one of lens surfaces of these three lenses, provided at a position closest to the deflecting means, having a toric surface whose rotational symmetrical axis is defined in the direction perpendicular to the rotational axis of the deflecting means, the other lens surface of these three lenses, provided at a position furthest from the deflecting means, having a toric surface whose rotational symmetrical axis is defined in the direction perpendicular to the rotational axis of the deflecting means, and the other lens surface of these three lenses, provided at a position far from the deflecting means, having a toric surface whose rotational symmetrical axis is defined in the direction perpendicular to the rotational axis of the deflecting means, and each of the lenses having a function of image-forming each of the light beams deflected by the deflecting means to be scanned on a predetermined image surface at an uniform speed, and a function of correcting influence of variation of an inclination of the reflective surface on a position of the light beam on the image surface, being exerted onto each of the light beams, expressed as deviation of an angle formed between the reflective surface of the deflector and the rotational axis of the reflective surface.

According to a third aspect of the present invention, there is provided a multi-beam laser exposer unit comprising: deflecting means, having reflective surfaces formed to be rotatable, for deflecting light beam emitted from a plurality of light beam sources in a predetermined direction; pre-deflection optical means for converting each light beam emitted from each light beam source to a convergent light beam in a direction parallel to a rotational axis of each surface of the deflecting means, and to a convergent light beam or a parallel light beam in a direction perpendicular to the rotation axis of each surface of the deflecting means so as to be guided to the reflective surfaces of the deflecting means; post-deflection optical means having three lenses, each of the lenses having a function of image-forming each of the light beams deflected by the deflecting means to be scanned on a predetermined image surface at an uniform speed, and a function of correcting influence of an inclination of the reflective surface on variation of a position of the light beam on the image surface, being exerted onto each of the light beams, expressed as deviation of an angle formed between the reflective surface of the deflector and the rotational axis of the reflective surface; and mirror members for separating the respective light beams passed through the post-deflecting optical means, wherein the deflecting means deflect the light beam directing to one of the mirror members provided at a position closest to an image surface and the light beam directing to one of the mirror members provided at a position secondly closest to an image surface at a narrowest distance in a direction parallel to the rotational axis of the surface of the deflecting means.

According to a fourth aspect of the present invention, there is provided a multi-beam laser exposure unit comprising: a plurality of light beam sources for emitting light beam, the respective light beam sources provided in a second direction perpendicular to a first direction to have a different distance, and directed to a different direction from each other in a plane including the first direction; a combined mirror, having reflective surfaces whose number is smaller than the number of the light beam sources, for directing each of light beam emitted from the light beam sources in the same direction of the first direction; deflecting means, having reflective surfaces formed to be rotatable in the first direction, for deflecting the respective light beams emitted from the respective light beam sources and combined by the combined mirror in a predetermined direction; pre-deflection optical means for converting each light beam emitted from each light beam source to a convergent light beam in a direction parallel to a rotational axis of each surface of the deflecting means, and to a convergent light beam or a parallel light beam in a direction perpendicular to the rotation axis of each surface of the deflecting means so as to be guided to the reflective surfaces of the deflecting means; and post-deflection optical means having three lenses, each of the lenses having a function of image-forming each of the light beams deflected by the deflecting means to be scanned on a predetermined image surface at an uniform speed, and a function of correcting influence of variation of an inclination of the reflective surface on a position of the light beam on the image surface, being exerted onto each of the light beams, expressed as deviation of an angle formed between the reflective surface of the deflector and the rotational axis of the reflective surface, wherein each of normal lines of the mirror surfaces of the combined mirror are arranged at a different angle to a line connecting the light beam source, which is not reflected by the combined mirror, to the deflecting means, and a mirror surfaces of the combined mirror reflects light beam separated nearest from light beam emitted from the light beam source, which is not combined by the combined mirror.

According to a fifth aspect of the present invention, there is provided a multi-beam laser exposer unit comprising: light beam sources; deflecting means, having reflective surfaces to be rotatable around a rotational axis, for deflecting the respective light beams emitted from the respective light beam sources in a predetermined direction; pre-deflection optical means, provided between the deflecting means and each of the light beam sources, for converting the light beam from the light beam sources to a convergent light beam in a direction parallel to a rotational axis of each surface of the deflecting means, and to a convergent light beam or a parallel light beam in a direction-perpendicular to the rotation axis of each surface of the deflecting means so as to be guided to the reflective surfaces of the deflecting means; and post-deflection optical means having three lenses, the lenses having positive, negative, and positive power, respectively, in the direction parallel to the rotational axis of each surface of the deflecting means, the lenses having positive, negative, and positive power, respectively, in the direction perpendicular to the rotational axis of each surface of the deflecting means and an incident surface of each of the lenses is formed to be concave toward the direction perpendicular to the rotational axis of each surface of the deflecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

An embodiment of the present invention will be described with reference to the drawings.

Figure 1:
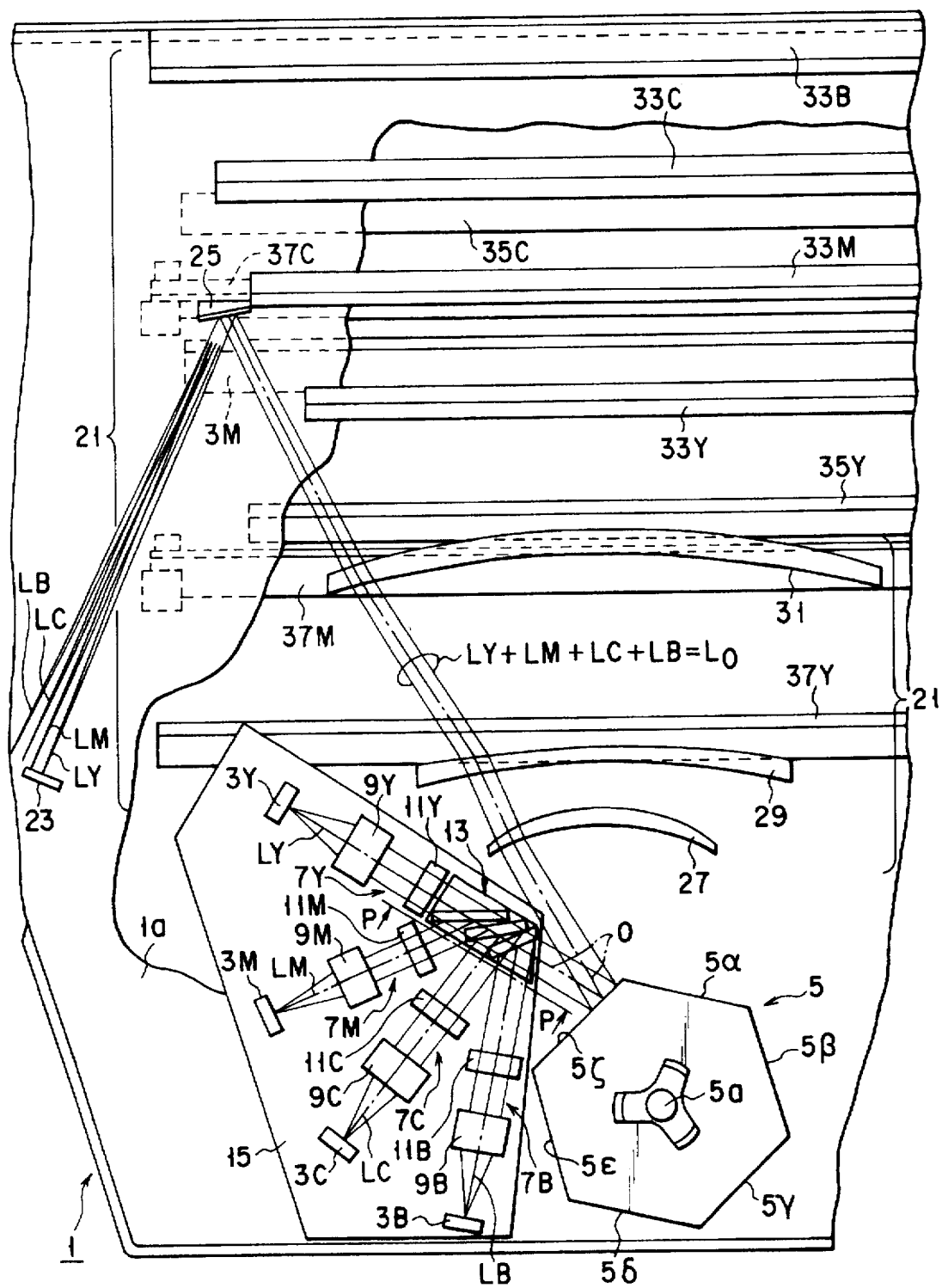
FIG. 1 is a partial plane view schematically showing a laser exposure unit of an embodiment of the present invention.
Figure 2:
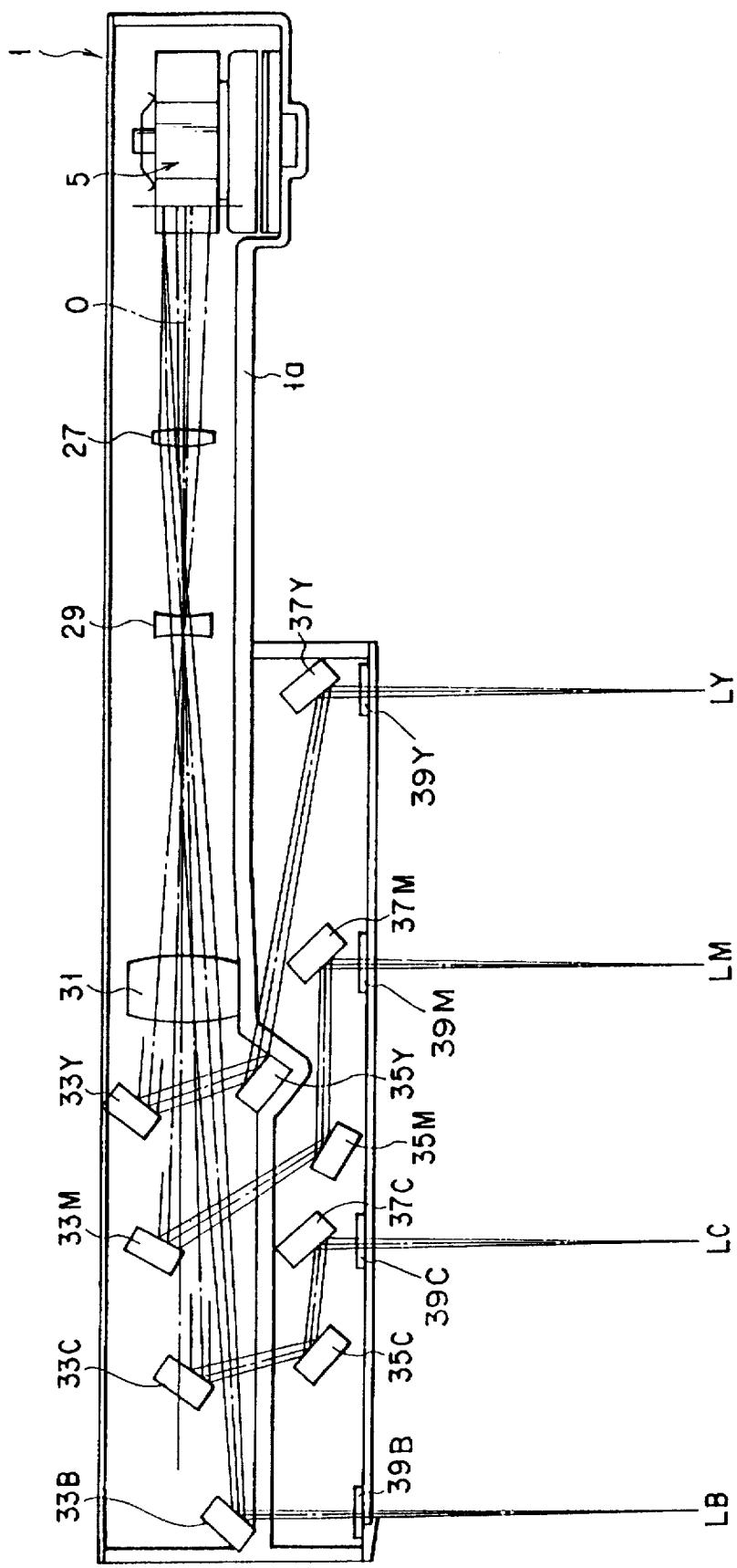
FIG. 2 is a cross sectional view of the laser exposure unit of FIG. 1 shown along an optical axis extending from a deflector to an image plane.

FIGS. 1 and 2 are a schematic plane view and a schematic cross sectional view of a multi-beam light scanning unit 1 of an embodiment of the present invention, respectively.

In a multi-color laser beam printer, there are used image data which is color-separated to the respective color components of Y (Yellow), M (Magenta), C (Cyan), and B (Black), and four pairs of image forming units for forming an image corresponding to image data, which is color-separated to the respective color components Y, M, C, and B. Therefore, the units and image data can be discriminated by the subscripts of Y, M, C, and B.

According to FIGS. 1 and 2, the multi-beam light scanning unit 1 includes first to fourth semiconductor lasers 3Y, 3M, 3C, and 3B for emitting first to fourth laser beams LY, LM, LC, and LB corresponding to image data, which is color-separated to the respective color components Y, M, C, and B, and one polygonal mirror unit 5, which scans first to fourth laser beams LY, LM, LC, and LB emitted from the semiconductor lasers 3Y, 3M, 3C, and 3B in a direction to an image surface (not shown) (an image forming object provided at a predetermined position, for example, a surface of a photosensitive drum) at a predetermined linear speed.

Each of light source side optical systems, that is, pre-deflection optical systems 7Y, 7M, 7C and 7B is provided between each of the lasers 3Y, 3M, 3C, 3B and the deflector 5. The pre-deflection optical systems 7Y, 7M, 7C and 7B are used to adjust the shapes of the cross-section beam spots of the laser beams LY, LM, LC, LB emitted from the semiconductor lasers 3Y, 3M, 3C, 3B to predetermined shapes, respectively.

A post-deflection optical system 21 is provided between the deflector 5 and the image surface (not shown). The post-deflection optical system 21 is used such that the laser beams LY, LM, LC, LB deflected by the deflector 5 are image-formed at a predetermined position substantially linearly on the image surface, respectively.

The following will explain the deflector 5, the pre-deflection optical systems 7 and the post-deflection optical system 21.

Each of the pre-deflection optical systems 7 has a combined mirror 13 between each of the lasers 3 and the deflector 5.

The lasers 3M, 3C, and 3B are arranged to have a predetermined angle in order of 3M, 3C and 3B. The laser 3Y corresponding to an Y (yellow) image is provided such that the laser beam LY, directing to the reflective surface of the deflector 5, can be directly made incident on the deflector 5.

The deflector 5 has a polygonal mirror body 5a having six-face plane reflectors (reflective surfaces) 5α to 5ζ arranged in a shape of a regular polygon, and a motor 5m for rotating the polygonal mirror body 5a in a predetermined direction at a fixed speed. The polygonal mirror body 5a is formed of, for example, an aluminum alloy. Each of the reflective surfaces 5α to 5ζ of the polygonal mirror body 5a is cut along a surface perpendicular to a surface including a direction where the polygonal mirror body 5a is rotated. Then, a surface protection layer, which is formed of $SiO_2$, is deposited on the cut surface.

The pre-deflection optical systems 7Y, 7M, 7C, and 7B have finite focal lenses 9Y, 9M, 9C, and 9B, hybrid cylinder lenses 11Y, 11M, 11C, and 11B, and one combined lens 13. Each of the finite focal lenses 9Y, 9M, 9C, and 9B provides a predetermined convergence to each of the laser beams LY, LM, LC, LB, which is emitted from each of the lasers 3Y, 3M, 3C, 3B, in both a first direction (hereinafter called "main scanning direction") where the laser beams LY, LM, LC, LB are deflected by the deflector 5 and a second direction (hereinafter called "sub-scanning direction"), which is perpendicular to the first direction. Each of the hybrid cylinder lenses 11Y, 11M, 11C, 11B provides further convergence to each of the laser beams L, which are respectively passed through the finite focal lenses 9 (Y, M, C, B), only in the sub-scanning direction. The combined mirror 13 is used to bend three laser beams, which are passed through the respective hybrid cylinder lenses 11Y, 11M, 11C, 11B, toward reflective surfaces 5α to 5ζ of the polygonal mirror body 5a, respectively. The lasers 3Y, 3M, 3C, 3B, the finite focal lenses 9Y, 9M, 9C, 9B, the hybrid cylinder lenses 11Y, 11M, 11C, 11B, and the combined mirror 13 are integrally arranged on a support member 15, which is formed of, for example, an aluminum alloy.

As the finite focal lenses 9Y, 9M, 9C, 9B, there is used an aspherical glass lens or a lens formed by adhering a UV (ultraviolet) light-curing plastic made aspherical portion to the surface of the spherical glass lens. The respective finite focal lenses 9Y, 9M, 9C, 9B are fixed onto the support member 15 through a lens holding member, which is not shown and formed of material having substantially the same coefficient of thermal expansion as the support member 15.

Only one horizontal sync detector 23 and only one pair of horizontal sync mirrors 25 is provided in a part of the post-deflection optical system 21 and its surrounding. The horizontal sync detector 23 detects a timing of the respective laser beams LY, LM, LC, LB, which are passed through a predetermined position of the post-deflection optical system 21. The horizontal sync mirrors 25 are provided between the post-deflection optical system 21 and the horizontal sync detector 23 to reflect a part of the four laser beams LY, LM, LC, LB, which are passed through at least one lens (to be described later) of the post-deflection optical system 21 and are reflected from the reflective surfaces of the deflector 5 at a predetermined angle.

The post-deflection optical system 21 has first to third image-forming lenses 27, 29, and 31. The first to third image-forming lenses 27, 29, and 31 provide a predetermined aberration characteristic to the respective four laser beams LY, LM, LC, LB, which are deflected by the reflective surfaces 5α to 5ζ of the deflector 5 in the entire area of the wide scanning width, that is, the entire length area of the main scanning direction at the image surface of the laser beam scanned on the image surface by the deflector 5. Moreover, the first to third image-forming lenses 27, 29, and 31 are used to control the variation of the image-forming surface of each of the laser beams to be in a fixed range.

There are provided first mirrors 33Y, 33M, 33C, 33B, second mirrors 35Y, 35M, 35C, and third mirrors 37Y, 37M, 37C between the third image-forming lens 31 and the image surface (not shown). The first mirrors 33Y, 33M, 33M, 33B are used to bend the respective four laser beams LY, LM, LC, LB, which are passed through the third image-forming lens 31, to the image surface. The second mirrors 35Y, 35M, 35C, and third mirrors 37Y, 37M, 37C are used to further bend the laser beams LY, LM, LC, which are bent by the first mirrors 33Y, 33M, 33C. The first to third image-forming lenses 27, 29, 31, the first mirrors 33Y, 33M, 33M, 33B, and the second mirrors 35Y, 35M, 35C are respectively fixed to an intermediate base 1a of the laser exposer unit 1 (for example, a plurality of fixing members (not shown) which are integrally formed) with adhesive.

The third mirrors 37Y, 37M, 37C are arranged at the intermediate base 1a to be movable to at least one direction in connection with the sub-scanning direction through a fixing rib (not shown), which is integrally formed, and an inclination adjusting mechanism (not shown).

As is obvious from FIG. 2, the laser beam LB corresponding to the B (black) image is bent by the first mirror 33B, and guided to the image surface without being passed through the other mirrors. Dustproof glasses 39Y, 39M, 39C, 39B are arranged at a portion among the third mirrors 37Y, 37M, 37C, the first mirror 33B, and the image surface, and a position where four laser beams LY, LM, LC, LB reflected by the mirrors 33B, 37Y, 37M, 37C are emitted from the laser exposer unit 1. The dustproof glasses 39Y, 39M, 39C, 39B are used to prevent toner and/or dust from being entered the interior of the laser exposure unit 1.

The following will specifically explain the pre-deflection optical system.

Figure 3:
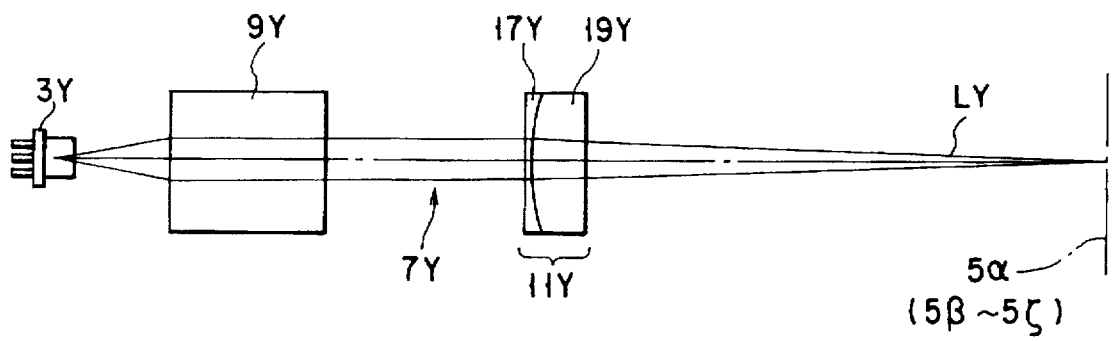
FIG. 3 shows a pre-deflection optical portion of the laser exposure unit of FIG. 1, and particularly an expanded view of an optical path of a yellow laser beam for forming a yellow latent image.

FIG. 3 is a partial cross sectional view of the pre-deflection optical system 7 from which a mirror block is omitted. Table 1 shows optical characteristic data of the lenses forming the pre-deflection optical system 7 and of the optically functioning members. In FIG. 3, the lenses corresponding to one laser beam LY (corresponding to the yellow image) and the optically functioning members are typically shown.

The hybrid cylinder lens 11Y is formed of a cylinder lens 17Y of PMMA having substantially the same radius of curvature to the sub-scanning direction, and a glass cylinder lens 19Y. The surface of the cylinder lens 17Y, which is in contact with air, is formed to be plane.

An outgoing surface of the cylinder lens 17Y and an incident surface of the cylinder lens 19Y are adhered to each other, or pressurized toward a positioning member (not shown) from a predetermined direction, so that the cylinder lens 17Y and the glass cylinder lens 19Y are formed to be integral with each other. The cylinder lens 17Y may be integrally formed on a surface having curvature of the cylinder lens 19Y.

The cylinder lens 17Y is formed of material such as PMMA (polymethyl methacryl). The cylinder lens 19Y is formed of material such as SFS1. The cylinder lenses 17Y and 19Y are fixed to the finite focal lens 9 through the positioning member, which is formed to be integral with the support member 15, to have a correct distance.

Table 1 shows optical numeric data of the pre-deflection optical system 7.

TABLE 1

A (pre-deflection optical lens data for YELLOW, BLACK)

| curvature | | | | |
|---|---|---|---|---|
| main-scanning | sub-scanning | thickness | material | others |
| — | — | 10.980 | air | f = 10.658 |
| plane | plane | 24.858 | air | NA = 0.33 |
| plane | $2.759 \times 10^{-2}$ | 0.1 | PMMA | |
| plane | plane | 5.0 | glass | n = 1.895 |
| | | 67.270 | air | |

| | |
|---|---|
| shift from optical axis at reflecting surface $5\alpha$ - $5\zeta$ of optical deflector | 2.981 |
| inclination from optical axis at reflecting surface $5\alpha$ - $5\zeta$ of optical deflector | $1.672 \times 10^{-2}$ (rad) |

For BLACK, −1 should be multiplied to the amount of shift and inclination

B (pre-deflection optical lens data for MAGENTA)

| curvature | | | | |
|---|---|---|---|---|
| main-scanning | sub-scanning | thickness | material | others |
| — | — | 10.980 | air | f = 10.658 |
| plane | plane | 31.016 | air | NA = 0.33 |
| plane | $2.759 \times 10^{-2}$ | 0.1 | PMMA | |
| plane | plane | 5.0 | glass | n = 1.895 |
| | | 67.840 | air | |

| | |
|---|---|
| shift from optical axis at reflecting surface $5\alpha$ - $5\zeta$ of optical deflector | −0.729 |
| inclination from optical axis at reflecting surface $5\alpha$ - $5\zeta$ of optical deflector | $-4.037 \times 10^{-3}$ (rad) |

C (pre-deflection optical lens data for CYAN)

| curvature | | | | |
|---|---|---|---|---|
| main-scanning | sub-scanning | thickness | material | others |
| — | — | 10.980 | air | f = 10.658 |
| plane | plane | 31.106 | air | NA = 0.33 |
| plane | $2.759 \times 10^{-2}$ | 0.1 | PMMA | |
| plane | plane | 5.0 | glass | n = 1.895 |
| | | 67.773 | air | |

| | |
|---|---|
| shift from optical axis at reflecting surface $5\alpha$ - $5\zeta$ of optical deflector | 1.230 |
| inclination from optical axis at reflecting surface $5\alpha$ - $5\zeta$ of optical deflector | $6.846 \times 10^{-3}$ (rad) |

As is obvious from Table 1, as four sets of the finite focal lenses 9, substantially the same lenses are used. Also, as four sets of the hybrid cylinder lenses 11, substantially the same lenses are used. The pre-deflection optical system 7Y corresponding to Y (yellow) and the pre-deflection optical system 7B corresponding to B (block) are arranged in substantially the same manner. The pre-deflection optical system 7M corresponding to M (Magenta) and the pre-deflection optical system 7C corresponding to C (Cyan) are arranged such that the distance between the finite focal lens 9 and the hybrid cylinder lens 11 is widened as compared with the pre-deflection optical systems 7Y and 7B.

Figure 4:
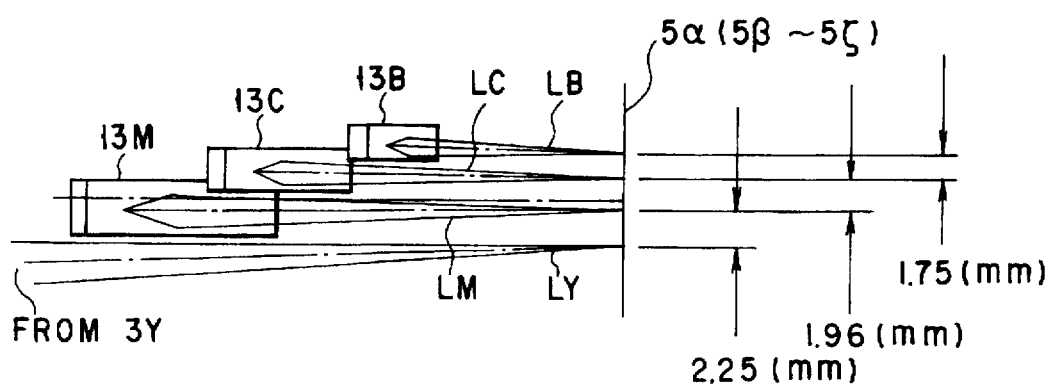
FIG. 4 is a front view of each of the pre-deflection optical systems cut along arrows P—P of FIG. 1 to show a state of each laser beam close to a combined mirror of the pre-deflection optical system of the laser exposure unit of FIG. 1.

FIG. 4 shows the laser beams LY, LM, LC, LB which are respectively emitted from the laser devices 3Y, 3M, 3C, 3B and directed to the deflector 5 in a state where each of the pre-deflection optical systems 7Y, 7M, 7C, 7B shown in FIG. 3 and Table 1 is cut along arrows P—P of FIG. 1 in a direction parallel to the rotational axis of the reflective surface of the deflector 5.

As is obvious from FIG. 4, the laser beams LY, LM, LC, and LB are guided to the deflector 5 to have a different distance in a direction, which is parallel with the rotational axis of the reflective surface of the deflector 5. Moreover, the laser beams LM and LC are asymmetrically guided to each of the reflective surfaces of the deflector 5 to sandwich the surface, which is perpendicular to the the axis of the reflective surface of the deflector 5 and which includes the center of the reflective surface in the sub-scanning direction, that is, the surface including the optical axis of the system of the laser exposure unit 1. Regarding the distance among the laser beams LY, LM, LC, and LB on each reflective surface of the deflector 5, the distance between LY and LM is 2.25 mm, the distance between LM and LC is 1.96 mm, and the distance between LC and LB is 1.75 mm.

The following will specifically explain the optical characteristic of the hybrid cylinder lens 11Y.

The first to third image-forming lenses 27, 29 and 31 (post-deflection optical system 21) are formed of plastic such as PMMA. Due to this, it is known that a refractive index n is varied from 1.4876 to 1.4789 if a peripheral temperature is changed between 0° C. and In this case, the sub-scanning direction image forming position is varied about ±12 mm when the laser beams, which are passed through the first to third image-forming lenses 27, 29 and 31, are actually condensed on the image surface (not shown), by using a previously normally glass lens to change the hybrid cylinder lens 11 of the present invention. In order to reduce the above variation, the lenses, which are formed of the same material as used in the lenses used in the post-deflection optical system 21, are incorporated into the pre-deflection optical system 7 in a state that its curvature is optimized. Thereby, the variation of the sub-scanning direction image forming position, which is caused by the variation of the refractive index n due to the change of temperature when the laser beams are actually condensed on the image surface, can be reduced to about ±0.5 mm. Therefore, as compared with the conventional optical system in which the pre-deflection optical system 7 is formed of glass lenses and the post-deflection optical system 21 is formed of plastic lens, it is possible to correct the chromatic aberration of the sub-scanning direction, which is caused by the variation of the refractive index due to the change of temperature of the lenses of the post-deflection optical system 21.

Figure 5A:
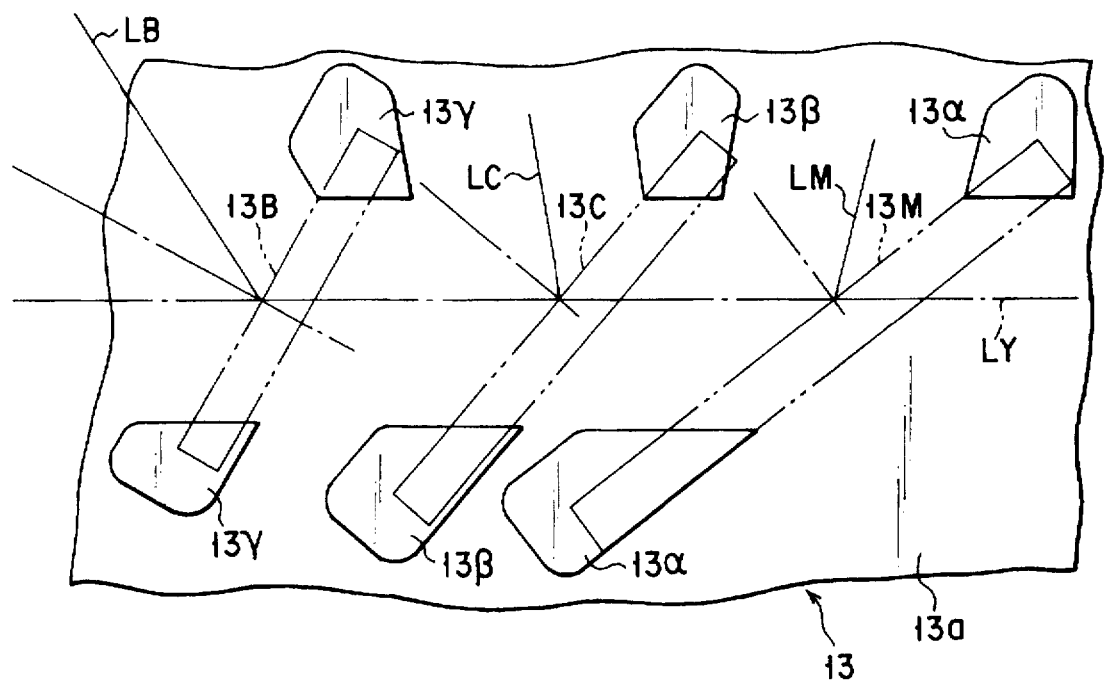
FIGS. 5A and 5B are a plane view and a front view each schematically showing a characteristic of the combined mirror incorporated into the laser exposure unit of FIG. 1.
Figure 5B:
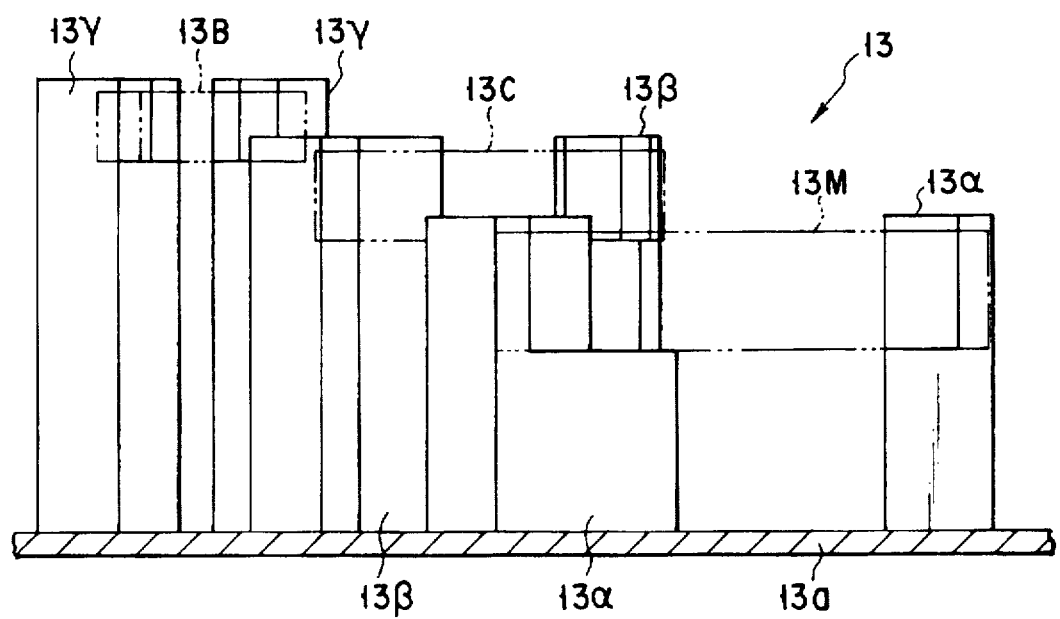

FIGS. 5A and 5B show the combined mirror 13 for guiding the first to fourth laser beams LY, LM, LC, and LB, serving as one flux of laser beams, to each of the reflective surfaces $5\alpha$ to $5\zeta$ of the reflector 5.

The combined mirror 13 has first to third mirrors 13M, 13C, 13B, first to third mirror holding sections $13\alpha$, $13\beta$, $13\gamma$, and a base 13a. The number of the first to third mirrors 13M, 13C, 13B is smaller than the number of image-formable color components (the number of color-separated colors). The first to third mirror holding sections $13\alpha$, $13\beta$, $13\gamma$ are used to hold the first to third mirrors 13M, 13C, 13B, respectively. The base 13a supports the mirror holding sections $13\alpha$, $13\beta$, $13\gamma$. The base 13a, and each of the mirror holding sections $13\alpha$, $13\beta$, $13\gamma$ are integrally formed of an aluminum alloy having a low efficient of thermal expansion.

As already explained, the laser beam LY sent from the laser device 3Y is directly guided to each of the reflective surfaces $5\alpha$ to $5\zeta$ of the deflector 5. In this case, the laser beam LY is passed between the mirror 13M, which is fixed to the first holding section 13α and the base 13a.

Figure 6:
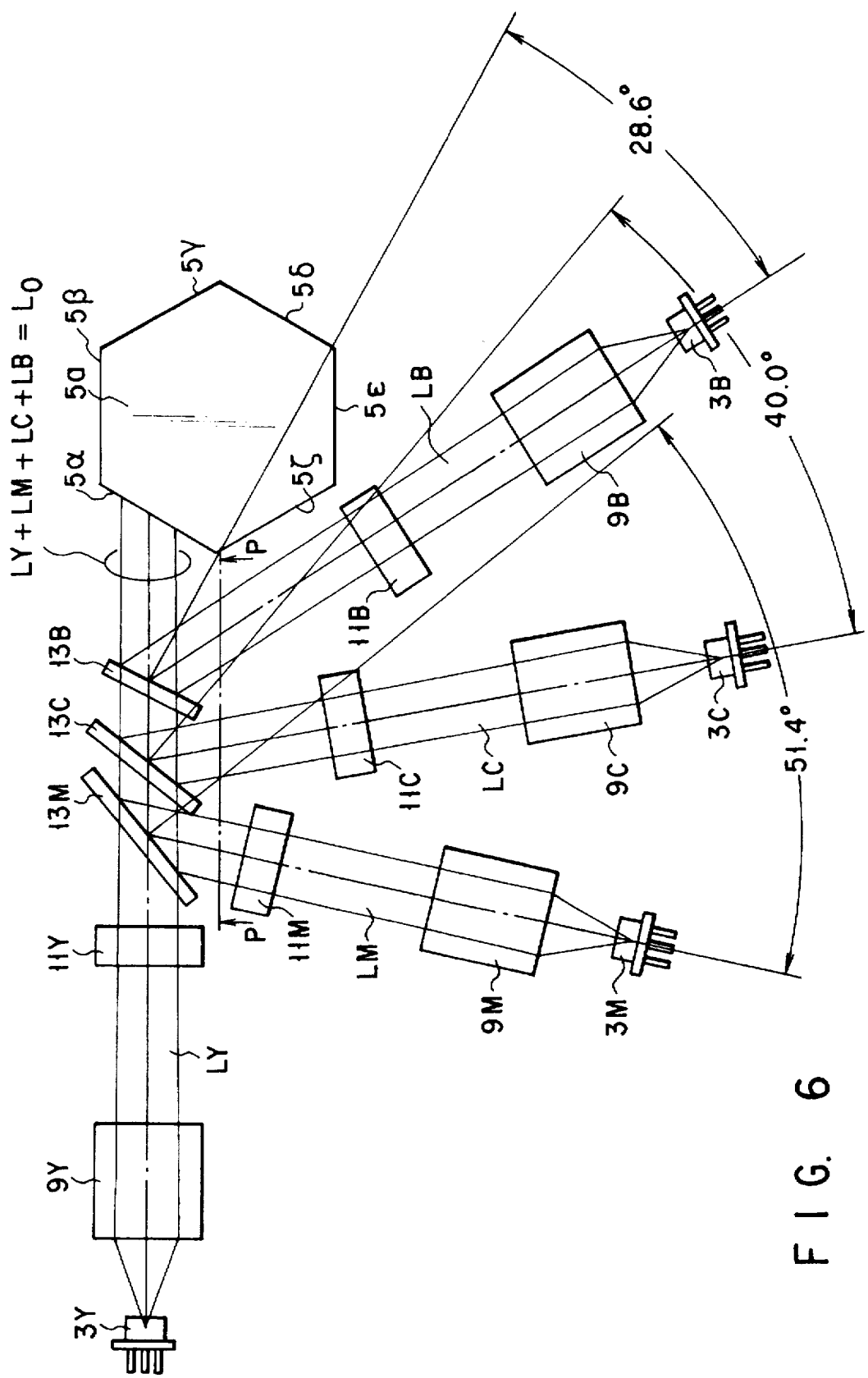
FIG. 6 is a partially enlarged plane view showing the details of the pre-deflection optical portion of the laser exposure unit of FIG. 1.

Incident angles of the laser beams LM, LC, and LB, which are respectively made incident onto the first to third mirrors 13M, 13C, and 13B, are defined to 51.4°, 40.0°, and 28.6°, respectively, as shown in FIG. 6. Needless to say, these angles are equal to angles between the laser beam LY and the normal line of the first to third mirrors 13M, 13C, 13B, respectively. In this embodiment, the arrangement of the laser devices 3M, 3C, 3B and the incident angles of the laser beams LM, LC, and LB, which are respectively made incident onto the first to third mirrors 13M, 13C, and 13B, are defined such that the distance between the laser beams close to each other on the reflective surfaces of the deflector 5 becomes large as the incident angle of the laser beam of the laser beams onto each mirror is large.

The following will explain intensity (amount of light) of the respective laser beams LM, LC, LB, which are reflected by the mirrors 13M, 13C, 13B, and guided to the deflector 5, and that of the laser beam LY, which is directly guided to the deflector 5.

As a method for making two or more laser beams incident onto the reflective surfaces of the deflector as one flux of laser beams, Jpn. Pat. Appln. KOKAI Publication No. 5-34612, for example, shows a method for overlaying laser beams on each other in order by use of half mirrors. However, in using the plurality of half mirrors, it is well-known that 50% of the amount of each of the light beam emitted from each laser device becomes useless when one reflection and transmission are performed, that is, every time when the laser beam is passed through the half mirror.

In this case, even if transmissivity of the half mirror and reflectance thereof are optimized in accordance with each laser beam, intensity (amount of light) of any one of the laser beams, which are passed through the half mirror, is reduced to about 25% of intensity of the laser beams outputted from the finite focal lens. Moreover, the half mirror is provided to be inclined to the optical path, and the number of half mirrors, which are passed through each laser beam, differs. Due to this, it is well known that there are generated a difference in the optical characteristics such as field curvature and astigmatism of the respective laser beams. Due to the difference in the optical characteristics such as field curvature and astigmatism of the respective laser beams, it is difficult for all laser beams to be image-formed by the same finite focal lens and the same cylinder lens.

In contrast, according to the combined mirror 13 shown in FIGS. 5A and 5B, the respective laser beams LM, LC, and LB are bent by the normal mirrors (13M, 13C, 13B) in the respective laser beams LM, LC and LB, which are made incident onto the respective reflective surfaces of the deflector 5, are separated in the sub-scanning direction. Therefore, the amount of light the respective laser beams LM, LC and LB, which are reflected by the normal mirrors 13M, 13C, 13B and supplied to the mirror body 5a, can be maintained to be 90% or more of the the amount of light emitted from the finite focal lens 9. Whereby, the output of the laser beam can be reduced, and the aberration of light to be reached at the image surface can be uniformly corrected, thereby making it possible to reduce the beam spot and lead to high precision. The laser 3Y corresponding to Y (yellow) is directly guided to each reflective mirror of the deflector 5 without being influenced by the combined mirror 13. Due to this, the output capacity of the laser can be reduced, and influence of the error of the incident angle onto each reflective surface, which may be caused in the other laser beams reflected by the mirrors 13M, 13C, 14B, can be reduced.

Figure 7:
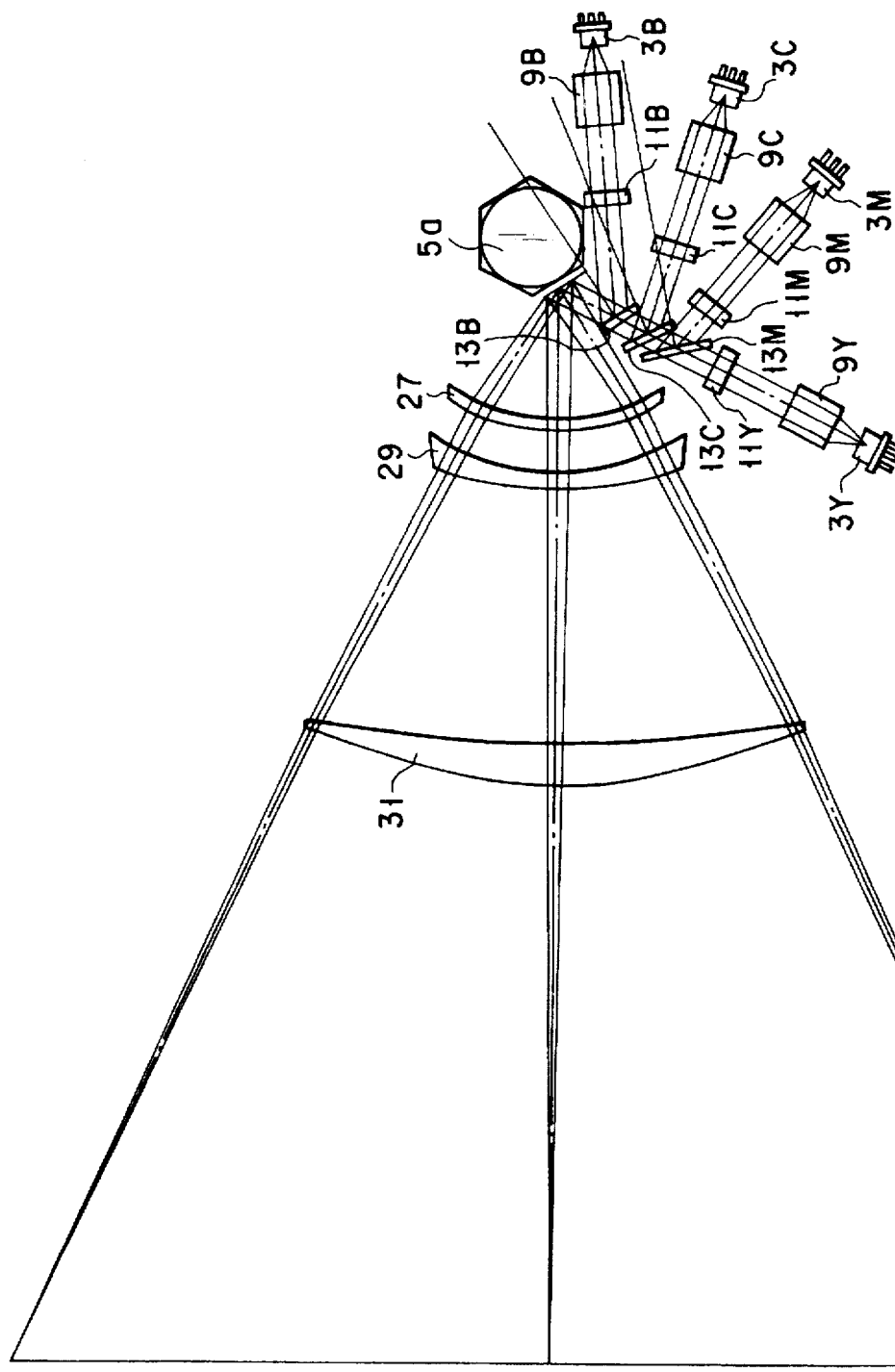
FIG. 7 is a schematic plane view showing the arrangement of the respective optical members of the laser exposure unit of FIG. 1 in a state where an optical path is expanded.
Figure 8:
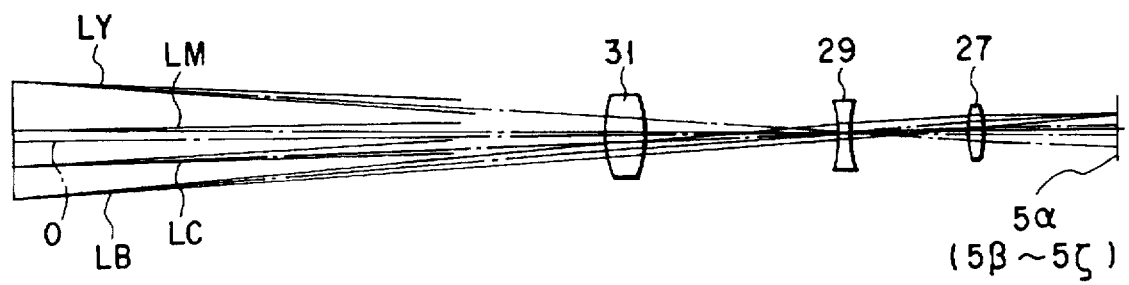
FIG. 8 is a cross sectional view showing the arrangement of the respective optical members of the laser exposure unit of FIG. 7 in a state where an optical path is expanded, and cut along a surface including an optical axis extending from a deflector to an image surface.
Figure 9:
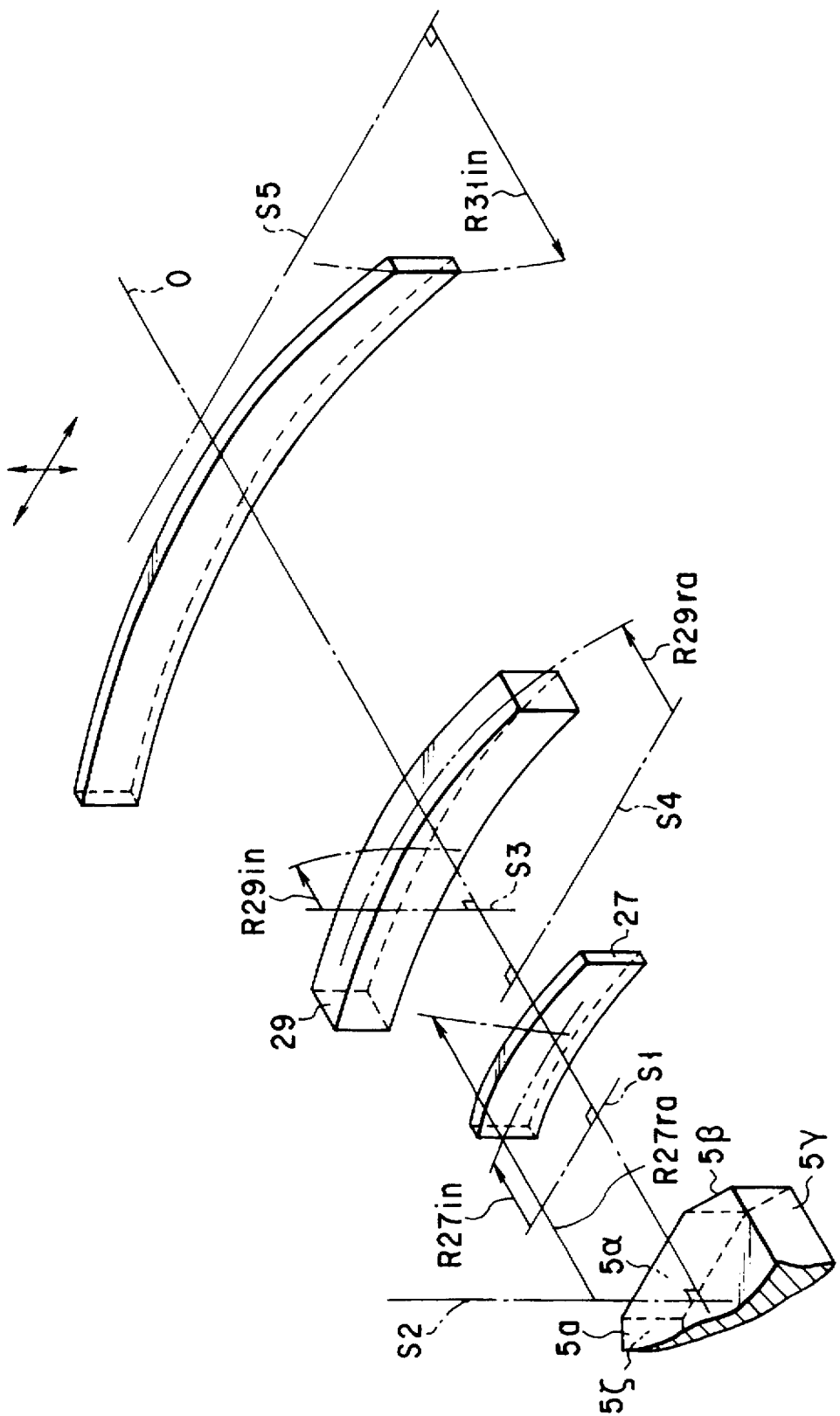
FIG. 9 is a schematic perspective view of a toric axis of each lens of a post-deflection optical portion of the laser exposure unit of FIG. 1.

The following will explain the relationship between the laser beams, which are reflected by the mirror body 5a, and the post-reflection optical system with reference to FIGS. 7 to 9 and Table 2 showing optical data including lens data of each lens of the post-reflection system 21.

TABLE 2

(post-deflection optical lens data)

| curvature | | | | | |
|---|---|---|---|---|---|
| main-scanning | sub-scanning | thickness | coefficient of aspherical surface | material | direction of toric axis |
| $-2.717 \times 10^{-2}$ | $1.680 \times 10^{-2}$ | 40.198 | | AIR | |
| $-3.189 \times 10^{-2}$ | $-4.621 \times 10^{-2}$ | 5.00 | $d = -5.856 \times 10^{-7}$<br>$e = -4.428 \times 10^{-10}$<br>$f = 9.197 \times 10^{-14}$<br>$g = -6.119 \times 10^{-16}$ | PMMA | main-scanning direction |
| $-2.612 \times 10^{-2}$ | $-2.152 \times 10^{-2}$ | 18.623 | $d = 1.496 \times 10^{-5}$<br>$e = f = g = 0$ | AIR | sub-scanning direction |
| $-1.758 \times 10^{-2}$ | $-6.116 \times 10^{-3}$ | 4.854 | $d = 8.742 \times 10^{-6}$<br>$e = f = g = 0$ | PMMA | sub-scanning direction |
| $-4.797 \times 10^{-3}$ | $1.475 \times 10^{-2}$ | 65.754 | $d = -1.826 \times 10^{-7}$<br>$e = 1.271 \times 10^{-11}$<br>$f = 4.567 \times 10^{-14}$<br>$g = -9.494 \times 10^{-18}$ | AIR | main-scanning direction |
| $-4.797 \times 10^{-3}$ | $1.475 \times 10^{-2}$ | 9.949 | $d = 1.858 \times 10^{-8}$<br>$e = -5.344 \times 10^{-12}$<br>$f = 1.127 \times 10^{-15}$<br>$g = -1.047 \times 10^{-19}$ | PMMA | main-scanning direction |
| $-5.009 \times 10^{-3}$ | — | | | | |
| plane | plane | 3.619 | $d = -1.445 \times 10^{-7}$<br>$e = -6.170 \times 10^{-13}$<br>$f = 9.639 \times 10^{-17}$<br>$g = -7.132 \times 10^{20}$ | AIR | |
| plane | plane | 2.00 | | BK7 | |
| plane | plane | 170.00 | | AIR | |

In this case, if a coordinate system is a right-hand system, a meridian of each lens in the main-scanning direction is shown as follow:

$$z = \frac{cy^2}{1+\sqrt{1-c^2(cc+1)y^2}} + dy^4 + ey^6 + fy^8 + gy^{10} \quad (1)$$

wherein c: curvature on the optical axis in the direction parallel to the direction of the toric axis of the toric lens, cc: coefficient of conic, d: coefficient of aspherical surface, e: coefficient of aspherical surface, f: coefficient of aspherical surface, and g: coefficient of aspherical surface.

In this case, the surface whose curvature of the sub-scanning, which is shown by "−", is a certain type of a lens shape, which is obtained by rotating the meridian to the optical axis. Moreover, the surface, which is shown by a specific value, shows a shape, which is obtained by rotating the meridian at the axis moved in parallel with the direction shown in the item of the toric axis in the plane separated in the direction of axis z of the local coordinates by the amount of 1/curvature.

FIG. 7 is an expanded view of the optical path seen from the direction crossing the sub-scanning direction in a state where the first to third mirrors 33B, 33Y, 33M, 33C, 35Y, 35M, 35C, 37Y, 37M, and 37C and the intermediate base 1a are removed.

FIG. 8 is an expanded view of the optical path along the optical axis of the sub-scanning direction in a state where a swing angle of the mirror body 5a of the deflector is 0°. In FIG. 8, the laser beams LC, LM and LY in the middle of the course are imaginarily replaced with straight lines and cut in a direction perpendicular to the axis of the mirror body 5a in a state that the first to third mirrors 33B, 35Y, 35M, 35C, 37Y, 37M, and 37C and the intermediate base 1a are removed in the laser beam.

FIG. 9 is a schematic perspective view explaining the axial direction of the toric surface of each of first to third plastic lenses 27, 29, and 31 shown in FIGS. 1, 7, and 8. In FIG. 9, the laser beams passed through each lens are omitted.

The first plastic lens 27 is a lens for forming a fθ lens. In other words, the first plastic lens 29 is a double-face toric lens in which the shape of the lens surface is formed on a toric surface of an incident surface (side of the deflector 5) $27_{in}$ and a toric surface of an outgoing surface (side of the image surface) $27_{ra}$, respectively. Toric symmetric axes of the respective surfaces of the lens 27, that is, an axis $S_1$, serving as a starting point of $R27_{in}$, and an axis $S_2$, serving as a starting point of $R27_{ra}$ are extended in the main scanning direction and the sub-scanning direction, respectively.

The second plastic lens 29 is a lens for forming a fθ lens. In other words, the second plastic lens 29 is a double-face toric lens in which the shape of the lens surface is formed on a toric surface of an incident surface (side of the deflector 5) $29_{in}$ and a toric surface of an outgoing surface (side of the image surface) $29_{ra}$, respectively. Toric symmetric axes of the respective surfaces of the lens 29, that is, an axis $S_3$, serving as a starting point of $R29_{in}$, and an axis $S_4$, serving as a starting point of $R27_{ra}$ are extended in the sub-scanning direction and the main-scanning direction, respectively.

The third plastic lens 31 is a lens for forming a fθ lens. In other words, the third plastic lens 31 is a single-face toric lens in which the shape of the lens surface is formed on a toric surface of an incident surface (side of the deflector 5) $31_{in}$ and a symmetrical aspherical surface of an outgoing surface (side of the image surface) $31_{ra}$, respectively. Toric symmetric axes of the respective surfaces of the lens 31, that is, an axis $S_5$, serving as a starting point of $R31_{in}$ is extended in the main scanning direction. The outgoing surface $31_{ra}$ is formed to be rotatably symmetrical in a state the optical axis O of the system.

The following will explain the toric axis of each of the first to third plastic toric lenses, the variation of the image forming surface, and the aberration characteristics.

In the conventional exposure unit, the toric axes of all toric lens are defined along the scanning direction. In this case, the aberration characteristics such as the spherical aberration on the image-forming surface, coma aberration, field curvature, or error of magnification cannot be independently set in the sub-scanning direction.

As a result of the simulation of the direction of the toric axis of each of the lens surfaces $27_{in}$, $27_{ra}$, $29_{in}$, $29_{ra}$, and $31_{in}$, $31_{ra}$ of the first to third toric lenses, the following points became clear.

More specifically, in a case where only one lens surface whose cross section in the sub-scanning direction is non-circular exists, the correction of the coma aberration and the spherical aberration become insufficient. As a result, the beam spot diameter of the cross section on the image-forming surface becomes about 100 μm. On the other hand, in a case where two lens surfaces whose cross sections in the sub-scanning direction are non-circular exist, the beam spot diameter of the cross section on the image-forming surface can be reduced to about 50 μm.

The aberration characteristics and the field curvature in the main scanning direction, and the variation of the magnification in the sub-scanning direction can be reduced by providing the toric axis in the main scanning direction.

Therefore, by combining the lenses having at least two lens surfaces of six surfaces of the first to third plastic lenses in which their cross sections in the sub-scanning direction are non-circular, the radius R of the curvature of the sub-scanning direction can be optimized at the respective positions of the lens surface in the main scanning direction, so that the aberration characteristics and the field curvature in the main scanning direction, and the variation of the magnification in the sub-scanning direction can be satisfied at the respective optimized positions. The outgoing surface $31_{ra}$ of the third plastic lens 31 is used to adjust the various characteristics of the main scanning direction. Without influence on the characteristics of the sub-scanning direction. If two lens surfaces whose toric axes are in the sub-scanning direction are allocated to each of two lens surfaces of the lens 27, a process jig used in forming the lens 27 can be made small, and precision of processing can be improved. However, it is recognized that an effective deflection angle is restrained by influence of the mutual relationship between three lenses, so that the distance between each of the reflective surfaces of the deflector 5 and the image surface is increased. Therefore, the lens surfaces whose toric axes are in the sub-scanning direction are preferably defined to the outgoing surface $27_{ra}$ of the first plastic lens 27 and the incident surface $29_{in}$ of the second plastic lens 29.

Regarding the laser beam $L_O$, which is formed by bundling the four laser beams LY, LM, LC, LB to substantially one flux of beams in the main scanning direction by the combined mirror 13, and which is reflected by each reflective surface of the deflector 5, the following will explain the relationship between the laser beam $L_O$ and the mirrors 33B, 33Y, 33M and 33C for separating the laser beam $L_O$ into the four laser beams again.

Figure 10:
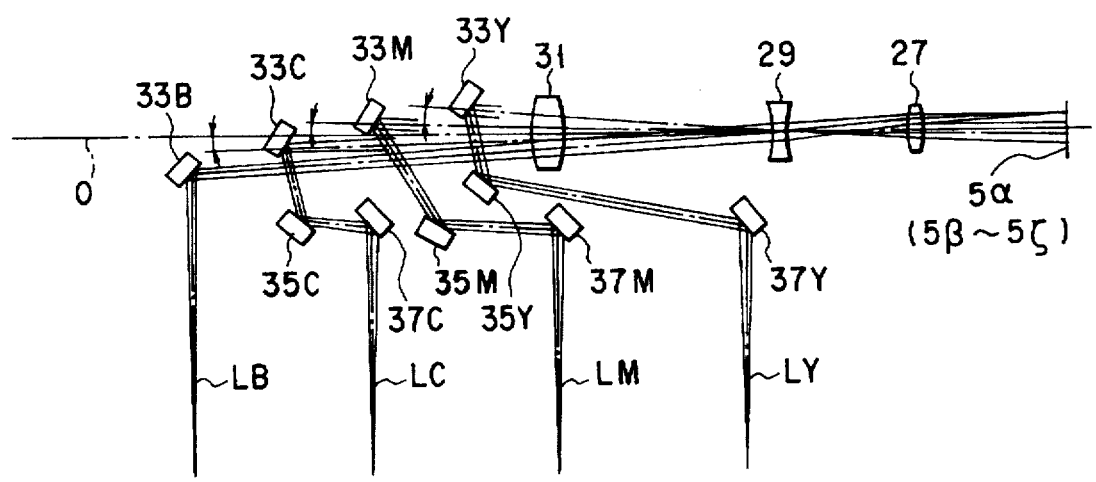
FIG. 10 is a cross sectional view showing the arrangement of the respective optical members of the laser exposure unit of FIG. 1, and cut along a surface including an optical axis extending from a deflector to an image surface.

FIG. 10 is a cross sectional view showing the arrangement of the respective optical members of the laser exposure unit of FIG. 1, and cut along a surface including the optical axis extending from a deflector to an image surface.

With reference to FIG. 10, the laser beams LY, LM, LC, LB are separated from the laser beam $L_O$ by the corresponding mirrors 33B, 33Y, 33M and 33C in the sub-scanning direction to have a predetermined angle to the optical axis O of the system, respectively.

More specifically, the laser beam LM is made incident onto each reflective surface of the deflector 5 to be the closest to the optical axis of the system by the first mirror 13M of the combined mirror 13. The laser beam LM is separated from the laser beam $L_O$ by the mirror 33M, which is provided at a position where an angle formed between the laser beam LM and the optical axis O of the system, which directs to the image surface (not shown) from each reflective surface of the deflector 5, becomes smaller than the case of the other laser beams. The laser beam LC is made incident onto each reflective surface of the deflector 5 to be close to the laser beam LM by the second mirror 13M of the combined mirror 13. The laser beam LC is separated from the laser beam $L_O$ by the mirror 33C, which is provided at a position where an angle formed between the laser beam LC and the optical axis O of the system, which directs to the image surface (not shown) from each reflective surface of the deflector 5, becomes larger than the laser beam LM and smaller than the laser beam LY.

The laser beam LY is made directly incident onto each reflective surface of the deflector 5 without being reflected by the combined mirror 13. The laser beam LY is separated from the laser beam $L_O$ by the mirror 33Y, which is provided at a position where an angle formed between the laser beam LY and the optical axis O of the system, which directs to the image surface (not shown) from each reflective surface of the deflector 5, becomes larger than the laser beams LC and LM.

The laser beam LB is passed through the lenses 27, 29, and 31 and bent by the mirror 33B as substantially the same as the laser beam LY positioned outside in the sub-scanning direction.

The above-mentioned difference in the angle between the optical axis O and each of the laser beams is useful to reduce influence of the variation of the refractive index and thermal expansion caused by the change of the temperature of PMMA, which is used as material of the lenses 27, 29, 31 of the post-deflection optical system 21, onto the shift of the position in the sub-scanning direction on the image surface.

For example, with reference to the laser beam LC, the laser device 3C is provided at the upper portion of the optical axis O at a predetermined angle to the optical axis O of the system of the sub-scanning direction. The laser beam LC sent from the laser device 3C is reflected on the upper portion of the optical axis O of the system on each reflective surface of the deflector 5. Then, the laser beam LC is passed through the upper portion of the optical axis O of the system or the portion close to the optical axis O at the first toric lens 27. The laser beam LC is passed through the portion close to the optical axis O at the second toric lens 29. Moreover, the laser beam LC is passed through the lower portion of the optical axis O of the system or the portion. The passing positions of the laser beam through the lenses 27 and 31 in the sub-scanning direction can be easily set by suitably arranging the respective optical axes of the laser devices 3Y, 3M, 3C, and 3B of the pre-deflection optical systems 7Y, 7M, 7C and 7B.

Similarly, with reference to the laser beam LM, the laser device 3M is provided at the slightly lower portion of the optical axis O at a predetermined angle to the optical axis O the system of the sub-scanning direction. The laser beam LM sent from the laser device 3M is reflected on the slightly lower portion of the optical axis O of the system on each reflective surface of the deflector 5. Then, the laser beam LM is passed through the lower portion of the optical axis O of the system or the portion close to the optical axis O at the first toric lens 27. The laser beam LM is passed through the portion close to the optical axis O at the second toric lens 29. Moreover, the laser beam LM is passed through the upper portion of the optical axis O of the system or a portion, which is the closest to the optical axis O at the third toric lens 31. The passing positions of the laser beam through the lenses 27 and 31 in the sub-scanning direction can be easily set by suitably arranging the respective optical axes of the the pre-deflection optical systems 7Y, 7M, 7C and 7B.

As mentioned above, the four laser beams are guided to the image surface (not shown) from the upper or lower portion to sandwich the optical axis of the system in the sub-scanning direction of the post-deflection optical system. Thereby, it is possible to reduce the influence of the variation of the refractive index and thermal expansion caused by the change of the temperature of PMMA, which is used as material of the lenses 27, 29, 31 of the post-deflection optical system 21, onto the shift of the position in the sub-scanning direction on the image surface.

Referring back to FIG. 2, the following will explain the relationship between each inclination of the laser beams LY, LM, LC, and LB, which are deflected by each of the reflective surfaces $5\alpha$ to $5\zeta$ of the mirror body $5a$ of the deflector 5 and emitted to the outer unit of the laser exposure unit 1 through the post-deflection optical system 21, and the mirrors 33B, 37Y, 37M, and 37C.

As explained above, the respective laser beams LY, LM, LC, and LB are deflected by the mirror body $5a$ of the deflector 5. Then, the predetermined aberration characteristics are provided to respective laser beams through the post-deflection optical system, that is, first to third toric lenses 27, 29 and 31. Thereafter, these laser beams are bent in a predetermined direction through the first mirrors 33Y, 33M, 33C, and 33B.

The laser beam LB corresponding to B (black image) is reflected by the first mirror 33B, and passed through the dustproof glass 39B to be guided to the image surface. The other laser beams are guided to the second mirrors 35Y, 35M, and 35C, and reflected toward the third mirrors 37Y, 37M, and 37C. The respective laser beams LY, LM, LC, which are reflected by the third mirrors 37Y, 37M, 37C, are image-formed on the image surface with substantially an equal interval through the dustproof glasses 39Y, 39M, and 39C. In this case, the laser beam LB emitted from the mirror 33B and the laser beam LC adjacent to the laser beam LB are also image-formed on the image surface with substantially an equal interval.

As explained above, the laser beam LB is emitted from the laser 3B, and passed through the pre-deflection optical system excluding the combined mirror 13, that is, the finite focal lens 9B and the hybrid cylinder lens 11B. Then, the laser beam LB is only reflected by the reflective surfaces of the mirror body $5a$ and the combined mirror 13, passed through the post-deflection optical system 21, that is, first to third toric lenses 27, 29, and 31, and emitted by the mirror 33B to be emitted to the outer unit of the laser exposure unit 1. In other words, after the laser beam LB is deflected by the mirror body $5a$, the laser beam can be emitted from the laser exposure unit 1 by only reflecting the laser beam LB by the mirror 33B. Thereby, there can be ensured the laser beam LB to be guided by substantially only mirror 33B. In a case where a plurality of mirrors exist in the optical path, the laser beam LB is useful as a reference beam of light in relatively correcting the other laser beams in view of the variation of the aberration characteristics of the image on the image surface multiplied in accordance with the number of mirrors.

In the case where a plurality of mirrors exist in the optical path, the number of mirrors to be used for each laser beam is preferably set to an odd number or an even number. In other words, as shown in FIG. 2, the number of mirrors after the deflector 5 relating to the laser beam LB is one (odd number) excepting the mirror body 5a of the deflector 5. The number of mirrors relating to each of the laser beams LC, LM and LY is three (odd number). It is assumed that the second mirror 35 relating to any one of the laser beams is omitted. The direction of the curve of the main scanning line, which is caused by the inclination of the lens of the laser beam (number of mirror: even number) passing through the optical path where the second mirror 35 is omitted, is opposite to the direction of the curve of the main scanning line, which is caused by the inclination of the lens, of the other laser beams (the number of mirror: odd number). As a result, there occurs an error of the registration in reproducing a predetermined color.

Therefore, the number of mirrors provided in the optical path of each of the laser beams LY, LM, LC, and LB is set to be substantially the odd or even number in overlaying four laser beams LY, LM, LC and LB to reproduce a predetermined color.

Tables 3 and 4 show optical numeric data of the optical system, which can be used as a modification of the pre-deflection optical system and that of the post-deflection system shown in Tables 1 and 2. In Tables 3 and 4, there is shown an example in which the outgoing surface of the lens 27 and the incident surface of the lens 29 in Tables 1 and 2 are respectively replaced with an aspherical rotatable symmetrical surface, which is rotatably symmetrical to the optical axis of the system.

TABLE 3

A (pre-deflection optical lens data for YELLOW, BLACK)

| curvature | | | | |
|---|---|---|---|---|
| main-scanning | sub-scanning | thickness | material | others |
| — | — | 11.232 | air | f = 10.658 |
| plane | plane | 24.872 | air | NA = 0.33 |
| plane | $2.157 \times 10^{-2}$ | 0.1 | PMMA | |
| plane | plane | 5.0 | glass | n = 1.902 |
| | | 78.161 | air | |

TABLE 3-continued

| | |
|---|---|
| shift from optical axis at reflecting surface 5α - 5ζ of optical deflector | 2.757 |
| inclination from optical axis at reflecting surface 5α - 5ζ of optical deflector | $1.949 \times 10^{-2}$ (rad) |

For BLACK, shift and inclination amount is given by multiplying −I,

B (pre-deflection optical lens data for MAGENTA)

| curvature | | | | |
|---|---|---|---|---|
| main-scanning | sub-scanning | thickness | material | others |
| — | — | 11.232 | air | f = 10.831 |
| plane | plane | 28.125 | air | NA = 0.33 |
| plane | $2.157 \times 10^{-2}$ | 0.1 | PMMA | |
| plane | plane | 5.0 | glass | n = 1.902 |
| | | 78.486 | air | |

| | |
|---|---|
| shift from optical axis at reflecting surface 5α - 5ζ of optical deflector | −0.678 |
| inclination from optical axis at reflecting surface 5α - 5ζ of optical deflector | $-4.670 \times 10^{-3}$ (rad) |

C (pre-deflection optical lens data for CYAN)

| curvature | | | | |
|---|---|---|---|---|
| main-scanning | sub-scanning | thickness | material | others |
| — | — | 11.232 | air | f = 10.831 |
| plane | plane | 27.742 | air | NA = 0.33 |
| plane | $2.157 \times 10^{-2}$ | 0.1 | PMMA | |
| plane | plane | 5.0 | glass | n = 1.902 |
| | | 78.446 | air | |

| | |
|---|---|
| shift from optical axis at reflecting surface 5α - 5ζ of optical deflector | 1.149 |
| inclination from optical axis at reflecting surface 5α - 5ζ of optical deflector | $7.871 \times 10^{-3}$ (rad) |

TABLE 4

(post-deflection optical lens data)

| curvature | | | | | |
|---|---|---|---|---|---|
| main-scanning | sub-scanning | thickness | coefficient of aspherical surface | material | direction of toric axis |
| $-3.512 \times 10^{-2}$ | $9.945 \times 10^{-3}$ | 39.291 | | AIR | |
| $-3.692 \times 10^{-2}$ | — | 5.00 | d = $-3.826 \times 10^{-8}$<br>e = $-3.984 \times 10^{-10}$<br>f = $-1.765 \times 10^{-12}$ | PMMA | Main-scanning direction |
| $-2.956 \times 10^{-2}$ | — | 24.287 | d = $-4.533 \times 10^{-8}$<br>e = $-3.402 \times 10^{-10}$<br>f = $-3.166 \times 10^{-14}$ | AIR | |
| $-1.982 \times 10^{-2}$ | $-1.834 \times 10^{-2}$ | 4.999 | d = $-2.656 \times 10^{-7}$ | PMMA | |

TABLE 4-continued (post-deflection optical lens data)

| curvature | | | | | |
|---|---|---|---|---|---|
| main-scanning | sub-scanning | thickness | coefficient of aspherical surface | material | direction of toric axis |
| $-1.982 \times 10^{-2}$ | $-1.834 \times 10^{-2}$ | 45.535 | $e = -2.871 \times 10^{-10}$<br>$f = -2.074 \times 10^{-14}$<br>$d = 2.268 \times 10^{-7}$<br>$e = -3.336 \times 10^{-11}$<br>$f = -4.971 \times 10^{-15}$ | AIR | main-scanning direction |
| $-5.093 \times 10^{-3}$<br>$-6.439 \times 10^{-3}$ | $1.389 \times 10^{-2}$<br>— | 12.918 | $d = 6.024 \times 10^{-8}$<br>$e = 2.888 \times 10^{-12}$<br>$f = -2.863 \times 10^{-16}$ | PMMA | main-scanning direction |
| plane | plane | 15.967 | $d = -1.857 \times 10^{-7}$<br>$e = 7.531 \times 10^{-12}$<br>$f = 2.467 \times 10^{-16}$ | AIR | |
| plane | plane | 2.00 | | BK7 | |
| plane | plane | 170.00 | | AIR | |

Note that, a coordinate system is a right system and a meridian of each lens in the main-scanning direction is shown in the equation (1) mentioned before.

According to the pre-deflection optical system 7 and the post-deflection optical system 21 shown in Tables 3 and 4, the curve of the scanning line of the main scanning direction is slightly deteriorated as compared with the example shown in Tables 1 and 2. However, it is recognized that convergent characteristics can be improved. Moreover, the allowable value of the error caused between the lens surfaces of each lens can be improved.

As mentioned above, according to the laser exposure unit of the present invention, there can be reduced the color shift or the change of concentration, which is caused by the shift of light, which is generated by the manufacturing error of the lens and the assembly error, and which is reached to the image surface. Moreover, there can be reduced the shift of the position in the sub-scanning direction, which is caused when temperature or humidity is changed. Further, there can be reduced the variation of the amount of light, which is made incident onto the post-deflection optical system, in accordance with the swing angle of deflecting means. Furthermore, one flux of beams is separated into a plurality of beams in order of the beam having a large distance between the adjacent beams on the reflective surface of deflecting means in the sub-scanning direction. Due to this, the size of deflecting means in the sub-scanning direction, that is, the thickness can be reduced.

In addition, the variation of the light focusing diameter on the image surface, which is caused by defocusing, can be restrained, so that the light focusing diameter on the image surface can be maintained at a predetermined value. Also, the distance between deflecting means and the image surface, that is, the size of the optical apparatus can be reduced. Moreover, there can be improved influence such as the color shift, which is caused on the image surface by the shift of position of the sub-scanning direction, or the curve of the main scanning line, which is exerted on the image.

Thereby, there can be provided a multi-beam exposure unit, which is suitable for an image forming unit for forming a color image having no registration error, with low cost.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multi-beam laser exposer unit, comprising:

light beam sources;

deflecting means, having reflective surfaces rotatable around a rotatable axis, for deflecting light beams emitted from said light beam sources in a predetermined direction;

pre-deflection optical means, provided between said deflecting means and each of said light beam sources, for converting the light beams from said light beam sources to a convergent light beam in a direction parallel to a rotational axis of each surface of said deflecting means, and to a convergent light beam in a direction perpendicular to the rotational axis of each surface of said deflecting means so as to be guided to said reflective surfaces of said deflecting means; and post-deflection optical means having an optical axis and three lenses, said lenses having positive, negative, and positive power, respectively, nearby the optical axis and in the direction parallel to the rotational axis of each surface of said deflecting means, said lenses having positive, negative, and positive power, respectively, nearby the optical axis and in the direction perpendicular to the rotational axis of each surface of said deflecting means, each positive power in the perpendicular direction being larger than that of the parallel direction, and each of said lenses having a function of image-forming each of said light beams deflected by said deflecting means to be scanned on a predetermined image surface at a uniform speed, and a function of correcting influence of variation of an inclination of the reflective surface on a position of the light beams scanned on the image surface.

2. The multi-beam laser exposer unit according to claim 1, wherein said pre-deflecting optical means includes a first lens, formed of a finite lens, and a second lens formed of at least two kinds of material; wherein said first lens converts the light beams emitted from each of said light beam sources to the convergent light beam in both the direction parallel to the rotational axis of each surface of said deflecting means and the direction perpendicular thereto, and said second lens has power in only the direction parallel to the rotational axis of each surface of said deflecting means, and converges the light beams passed through the first lens in only the direction parallel to the rotational axis of each surface of said deflecting means.

3. A multi-beam laser exposer unit comprising:

light beam sources;

deflecting means, having a rotational axis and reflective surfaces rotatable around the rotational axis, for deflecting light beams emitted from said light beam sources in a predetermined direction;

pre-deflection optical means, provided between said deflecting means and each of said light beam sources, for converting the light beams from said light beam sources to a convergent light beam in a direction parallel to the rotational axis of each surface of said deflecting means, and to a convergent light beam in a direction perpendicular to the rotational axis of each surface of said deflecting means; and post-deflection optical means having three lenses including a first lens, provided at a position closest to said deflecting means, having a toric surface whose rotational symmetrical axis is defined in the direction perpendicular to the rotational axis of said deflecting means, a second lens, provided at a position furthest from said deflecting means, having a toric surface whose rotational symmetrical axis is defined in the direction perpendicular to the rotational axis of said deflecting means, and a third lens, provided between the first and second lens, having a toric surface whose rotational symmetrical axis is defined in the direction perpendicular to the rotational axis of said deflecting means, each of said three lenses having a function of image-forming said light beams deflected by said deflecting means to be scanned on a predetermined image surface at uniform speed, and a function of correcting influence of variation of an inclination of the reflective surface on a position of the light beams scanned on the image surface.

4. The multi-beam laser exposer unit according to claim 3, wherein said pre-deflecting optical means includes a first lens, formed of a finite lens, and a second lens formed of at least two kinds of material; wherein said first lens converts the light beams emitted from each of said light beam sources to the convergent light beam in both the direction parallel to the rotational axis of each surface of said deflecting means and the direction perpendicular thereto, and said second lens has power in only the direction parallel to the rotational axis of each surface of said deflecting means, and converges the light beams passed through the first lens in only the direction parallel to the rotational axis of each surface of said deflecting means.

5. The multi-beam laser exposer unit according to claim 3, wherein each of the toric surfaces of the respective lenses of said post-deflection optical means included a non-circular generating line.

6. The multi-beam laser exposer unit according to claim 3, wherein a lens surface closest to said image surface side includes a rotationally symmetric aspherical shape.

7. A multi-beam laser exposer unit comprising:

light beam sources;

deflecting means, having reflective surfaces rotatable around a rotational axis, for deflecting light beams emitted from the respective light beam sources in a predetermined direction;

pre-deflection optical means, provided between said deflecting means and each of said light beam sources, for converting the light beams from said light beam sources to a convergent light beam in a direction parallel to a rotational axis of each surface of said deflecting means, and to a convergent light beam in a direction perpendicular to the rotation axis of each surface of said deflecting means so as to be guided to said reflective surfaces of said deflecting means; and post-deflection optical means having an optical axis and three lenses, said lenses having positive, negative, and positive power, respectively, nearby the optical axis and in the direction parallel to the rotational axis of each surface of said deflecting means, said lenses having positive, negative, and positive power, respectively, nearby the optical axis and in the direction perpendicular to the rotational axis of each surface of said deflecting means, wherein an incident surface of each of said lenses is formed to be concave toward the direction perpendicular to the rotational axis of each surface of said deflecting means, and an incident surface of one of said lenses having positive power is formed to be convex toward the direction parallel to the rotational axis of each surface of said deflecting means.

8. A multi-beam laser exposer unit, comprising:

light beam sources;

deflecting means, having reflective surfaces to be rotatable around a rotational axis, for deflecting light beams emitted from said light beam sources in a predetermined direction;

pre-deflection optical means, provided between said deflecting means and each of said light beam sources, for converting the light beams from said light beam sources to a convergent light beam in a direction parallel to a rotational axis of each surface of said deflecting means, and to a convergent light beam in a direction perpendicular to the rotational axis of each surface of said deflecting means so as to be guided to said reflective surfaces of said deflecting means; and post-deflection optical means having an optical axis and three lenses, said lenses having positive, negative, and positive power, respectively, nearby the optical axis and in the direction parallel to the rotational axis of each surface of said deflecting means, said lenses having positive, negative, and positive power, respectively, nearby the optical axis and in the direction perpendicular to the rotational axis of each surface of said deflecting means, wherein each positive power in the direction perpendicular to the rotational axis is larder than that of the parallel direction and each of said lenses has a function of image-forming each of said light beams deflected by said deflecting means to be scanned on a predetermined image surface at a uniform speed, and a function of correcting influence of variation of an inclination of the reflective surface on a position of the light beams scanned on the image surface, and wherein an incident surface of each of said lenses is shaped such that end portions thereof are projected toward said deflecting means in the direction perpendicular to the rotational axis of each surface of said deflecting means as compared with the center of the surface of each of said lenses and an incident surface of one of said lenses having positive power is formed to be convex toward the direction parallel to the rotational axis of each surface of said deflecting means.

\* \* \* \* \*